April 6, 1943.  H. J. DE N. McCOLLUM  2,315,636
AUTOMOBILE HEATER
Filed March 29, 1940   2 Sheets-Sheet 1
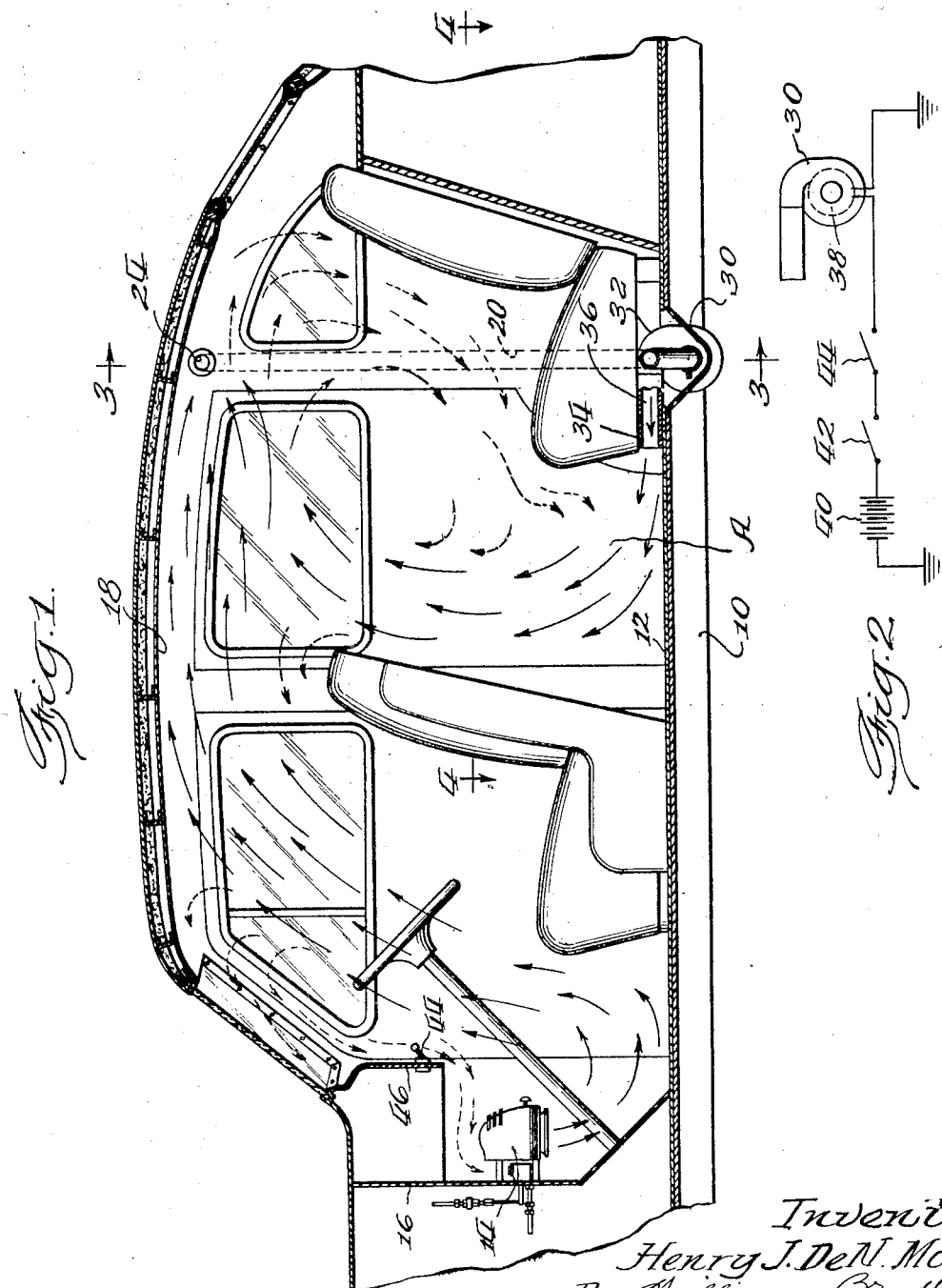
Inventor:
Henry J. DeN. McCollum
By Williams, Bradbury,
& Hinkle
Attys.

April 6, 1943.　　H. J. DE N. McCOLLUM　　2,315,636
AUTOMOBILE HEATER
Filed March 29, 1940　　2 Sheets-Sheet 2
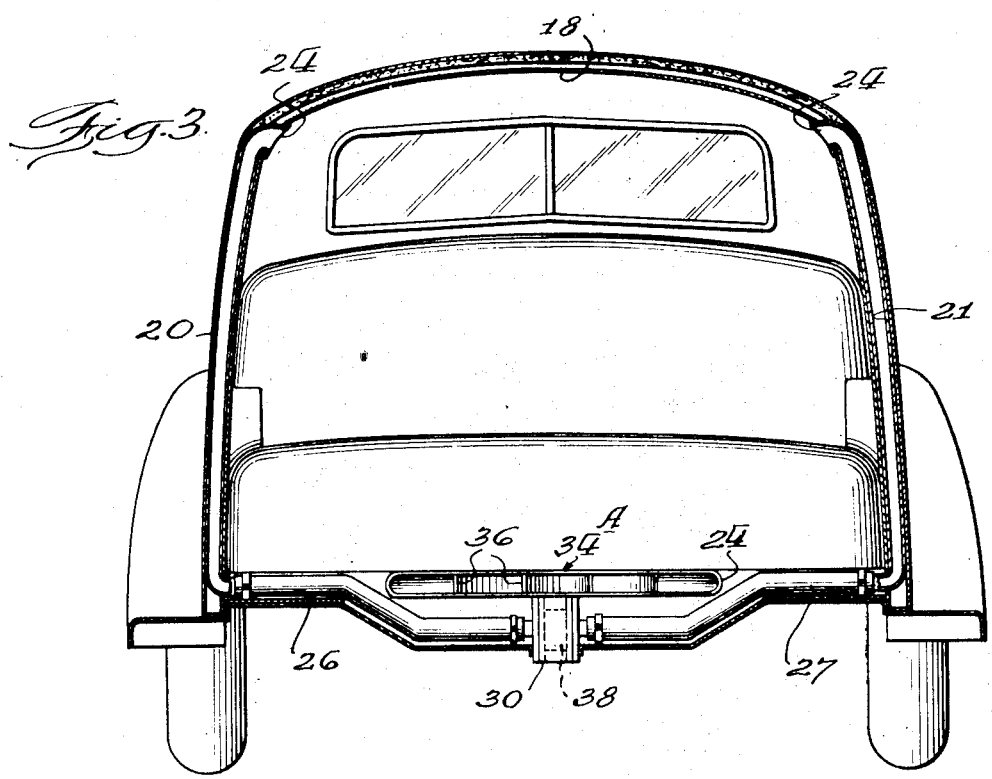
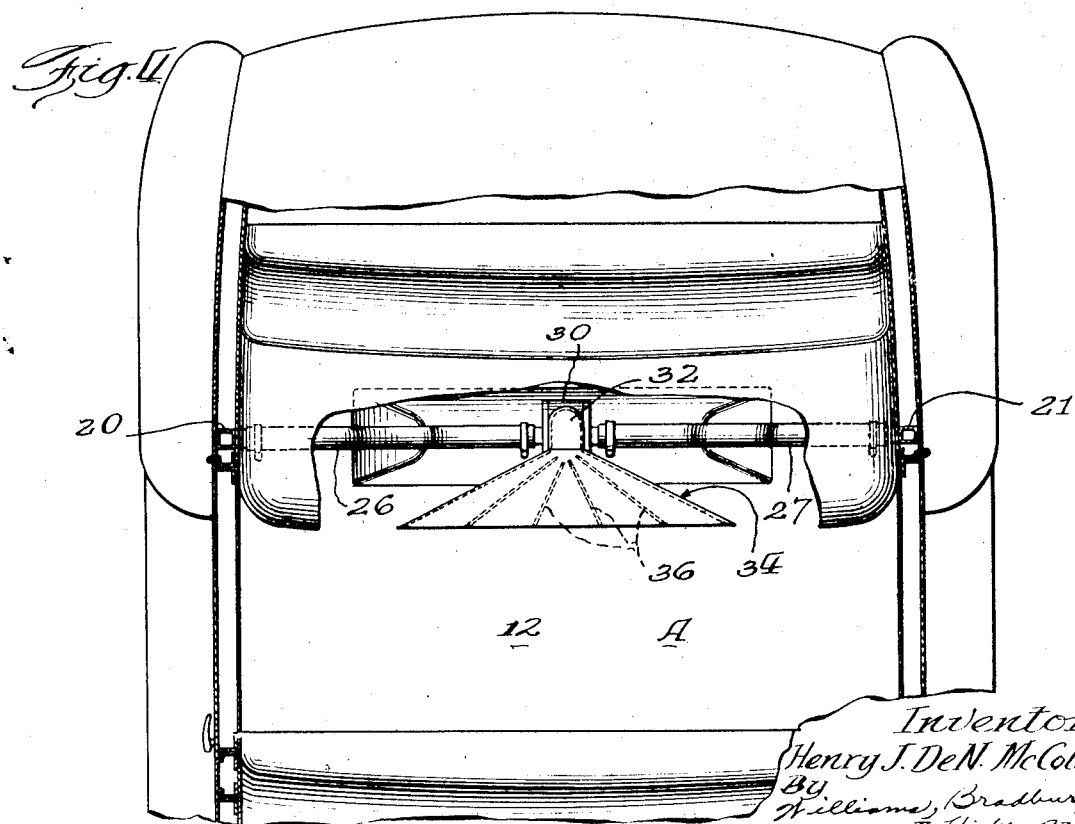

Patented Apr. 6, 1943

2,315,636

UNITED STATES PATENT OFFICE 2,315,636

AUTOMOBILE HEATER

Henry J. De N. McCollum, Chicago, Ill.

Application March 29, 1940, Serial No. 326,559

5 Claims. (Cl. 98—2)

My invention relates generally to heating systems for automobiles, particularly for automobiles of the sedan type, by means of which a fairly uniform distribution of heat throughout the passenger compartment may be obtained.

Considerable difficulty has been experienced in securing uniform heat distribution throughout the passenger compartments of sedan and coupé type automobiles. In certain installations of heating systems on automobiles, it has been found that there may be a temperature difference of approximately 50° F. between the temperature of the air adjacent the floor of the compartment and that located adjacent the top of the automobile. Such difference in temperature is more likely to be present in an automobile having a sedan type body than in a coupé type, although even in the latter there may be considerable differential between the temperature at the top and that at the bottom of the passenger compartment.

The common practice generally followed in an endeavor to overcome this difficulty has been to arrange the heater so as to direct its hot air output downwardly toward the floor of the automobile, on the assumption that due to its initial downward velocity the heated air will not rise to the top of the compartment as rapidly as might otherwise be the case. Other expedients which tend to overcome this difficulty are to provide several heaters having outlets spaced along the floor of the compartment, or providing a single heater with a plurality of spaced outlets. These methods of endeavoring to obtain more uniform distribution of the heated air throughout the vehicle are of course of some help, but have failed to provide an entirely satisfactory solution to the difficulty.

It will be understood that the comfort of the driver and passengers of the vehicle will depend to a great extent upon the temperature of the air adjacent the floor and will not be greatly affected by the temperature about the head because if the person's lower extremities are at a comfortable temperature, the vascular system of the body will usually readily compensate for relatively low temperatures about the head. Thus an ideal heating system for automobiles would be one in which the temperature adjacent the floor would be considerably higher than that adjacent the top of the vehicle. Since, however, this is not possible by any simple means, due to the convection currents which carry the heated air to the top of the vehicle, the most feasible method of approaching the ideal conditions is to provide means for reducing the temperature differential between the top and bottom to as small a value as possible.

In my copending application Serial No. 200,318, filed April 6, 1938, I have disclosed one method of overcoming most of the difficulties above alluded to. The present application pertains to a further improved means for securing a more uniform distribution of heat throughout the automobile passenger compartment.

It is an object of my invention to provide an improved means for preventing the presence of great differences in temperature between the air adjacent the top and that adjacent the bottom of the passenger compartment of an automobile.

A further object is to provide an improved means for withdrawing heated air from adjacent the top of the passenger compartment and discharging it at a point adjacent the floor thereof.

A further object is to provide an improved heating system for passenger automobiles of the enclosed type, in which means are provided to withdraw heated air from adjacent the top of the vehicle and to discharge it through outlets located closely adjacent the floor of the vehicle.

A further object is to provide an improved apparatus for causing uniform distribution of heat throughout the passenger compartment of an automobile by withdrawing air from the top of the compartment and discharging it along the bottom thereof.

Other objects will appear from the following description, reference being had to the accompanying drawings, in which:

Figure 1 is a longitudinal sectional view of the passenger compartment of an automobile showing the means for securing more uniform distribution of heat therein;

Figure 2 is a wiring diagram of the electrical circuit for controlling the operation of the apparatus;

Figure 3 is a transverse sectional view taken on the line 3—3 of Figure 1; and,

Figure 4 is a fragmentary horizontal sectional view taken on the line 4—4 of Figure 1, a portion of the rear seat being illustrated as broken away to show the essential features of the invention.

Referring to Fig. 1, the automobile passenger compartment is illustrated as having a side frame member 10 supporting a floor 12. The passenger compartment is adapted to be heated by any suitable heater 14, which may be of the type disclosed in my prior Patent No. 2,191,174, dated February 20, 1940, and preferably includes means for circulating air from the passenger compartment downwardly past the heater radiator, in a manner illustrated by the arrows which represent the flow of air. The heater 14 is preferably mounted on the dash 16 of the vehicle, and preferably sufficiently close to the floor 12 that the heated air discharged therefrom will flow against the floor and maintain the space adjacent the floor in front of the front seats of the vehicle at a comfortably high temperature. The heated air will not, however, remain closely adjacent the floor, but will rise due to convection currents in the general manner illustrated by the full line arrows of Fig. 1, and will tend to collect directly beneath the top 18. The tops of automobiles are generally fairly well insulated so that this heated air will accumulate beneath the top, its temperature ultimately attaining an uncomfortably high value, whereas the space along the floor of the compartment which is not subjected directly to the discharge from the heater 14 will remain at a comparatively low temperature. This would be especially true of the air between the front and rear seats adjacent the floor.

In the space A, circulation of air is impeded, since there is no force tending to cause the heated air to circulate downwardly into the space. It is only as the heated air becomes cooled by contact with the windows and walls of the compartment that it will cause down drafts into this space A. To overcome this difficulty, I have provided improved means for causing flow of air from the space adjacent the top of the automobile to the space A. This means comprises a pair of conduits 20, 21 which are preferably located between the sheet metal body of the automobile and the inner lining thereof. The upper ends of these conduits terminate in openings 24 closely adjacent the top 18, while their lower ends are connected by suitable conduits 26 and 27, to the central portion of the casing of an electric motor driven blower 30. The conduits 26 and 27, as well as the blower, are preferably covered with heat insulating material.

The discharge outlet of the blower comprises an elbow 32 which terminates in a fan-shaped air spreading casing 34 having a plurality of divergent baffle walls 36 for aiding in securing uniform distribution of the heat across the outlet of the casing. It will be noted from Fig. 1 that the casing 34 is preferably located beneath the rear seat so that it will deflect the heated air supplied by the blower 30 over a large proportion of the length of the rear seat.

The blower 30, as shown in Fig. 2, is driven by a motor 38 which is adapted to be connected to a source 40 of electrical energy, usually the storage battery of the vehicle, by a pair of switches 42, 44, which are in series with the blower motor and the source 40. The switch 42 may be the ignition switch of the automobile, or a switch operated coincidentally therewith, while the switch 44 is preferably located upon the instrument panel 46. It will be apparent from this diagram that the motor 38 can be energized only when the automobile engine is in operation and the switch 44 is closed.

If desired, the conduits 20, 21, may be located within the inner wall of the passenger compartment, although such location thereof appears to be practical only when the heating system is to be installed as an accessory upon the automobile.

In operation of the heating system of my invention, the heater 14 will operate in a normal manner to project the heated air downwardly toward the floor in front of the front seat from which space the heated air will rise rapidly in the path indicated generally by the arrows shown in full lines, and by coming into contact with the windows and side walls, some of the air stream will become cooled and flow in the directions indicated by the dotted line arrows. Of course, the air flow represented by the arrows in Fig. 1 is merely exemplary since circulation will take place in a large variety of different paths which could not be clearly indicated in a single figure. Whenever desired, as when the air adjacent the top of the vehicle becomes uncomfortably warm, the driver will operate the switch 44, energizing the blower driving motor. The blower will accordingly withdraw air through the openings 24 in the ends of the conduits 20 and 21 and discharge this air through the casing 34, the diverging baffles 36 therein causing a sufficient decrease in the speed of air flow through the casing that it will be discharged gently and will not be felt as a blast against the feet of the passengers seated on the rear seat. As a result, there will be greater turbulence of the air in the passenger compartment without creating excessive drafts so that the air throughout the compartment will be maintained at a substantially uniform temperature. By maintaining the temperature substantially uniform throughout the passenger compartment, greater comfort for the passengers may be obtained by a heater of relatively small capacity, since, if the temperature is uniform, the passenger will be comfortable even though the temperature is fairly low as compared with the temperatures usually maintained in homes. Thus, by the addition of the blower 30 and its intake and discharge conduits, an automobile passenger compartment may be efficiently heated with a relatively small size heater which otherwise would not be effective to provide comfortable temperature conditions in the automobile.

While I have shown and described a particular embodiment of my invention, it will be apparent to those skilled in the art that numerous variations and alterations may be made without departing from the underlying principles of the invention. I therefore desire, by the following claims, to include within the scope of my invention such variations and modifications of my invention by which substantially the results thereof may be obtained by substantially the same or equivalent means.

I claim:

1. In a heating system for the passenger compartment of an automobile, the combination of a heater located in the forward portion of the compartment and projecting heated air downwardly toward the floor of the automobile, a conduit opening adjacent the top of the vehicle and extending downwardly toward the floor thereof, a blower connected to draw air from said conduit, and means connected to the discharge side of said blower for discharging the air delivered thereby in a relatively low-speed wide stream along the floor of the automobile.

2. In a heating system for the passenger compartment of an automobile, the combination of a heater located at one end of the compartment, a conduit opening adjacent the top of the vehicle and extending downwardly toward the floor thereof, an outlet casing adjacent the floor of the compartment, said outlet casing having an outlet opening of substantially greater cross-sectional area than that of said conduit, and a motor driven blower circulating air through said conduit and casing in a direction to withdraw air from adjacent the top of the compartment and to discharge the air adjacent the bottom of the compartment.

3. In a heating system for the passenger compartment of a sedan type automobile, the combination of a heater located in the forward portion of the compartment, a conduit opening adjacent the top of the vehicle and extending downwardly toward the floor thereof, a blower connected to draw air from the lower end of said conduit, and a casing located beneath the rear seat of the automobile and connected to the discharge side of said blower for discharging the air delivered thereby at a relatively low-speed wide stream along the floor of the automobile.

4. In a heating system for the passenger compartment of an automobile, the combination of a heater located in the forward portion of the compartment and projecting heated air downwardly toward the floor of the automobile, a pair of conduits opening adjacent the top of the vehicle and on opposite sides thereof, said conduits extending downwardly toward the floor thereof, a blower common to said conduits for circulating air therethrough, and means connected to the discharge side of said blower for discharging the air delivered thereby in a relatively low speed wide stream along the floor of the automobile.

5. In a heating system for the passenger compartment of an automobile, the combination of a heater located in the forward portion of the compartment and projecting heated air downwardly toward the floor of the automobile, a conduit opening adjacent the top of the automobile and extending downwardly between walls of the passenger compartment to a point adjacent the floor thereof, a blower connected to draw air from said conduit, and means connected to the discharge side of said blower for discharging the air delivered thereby adjacent the floor of said compartment.

HENRY J. DE N. McCOLLUM.